United States Patent

Moeckel

[11] 4,037,263
[45] July 19, 1977

[54] ARRANGEMENT FOR THE DIRECT CONVERSION OF ITEMS OF DATA STORED IN MAGNETIC FORM INTO OPTICAL SIGNALS

[75] Inventor: Peter Moeckel, Munich, Germany

[73] Assignee: Siemens Aktiengesellschaft, Berlin & Munich, Germany

[21] Appl. No.: 597,682

[22] Filed: July 21, 1975

[30] Foreign Application Priority Data

July 23, 1974 Germany .................... 2435415

[51] Int. Cl.² ............................................ G02B 5/14
[52] U.S. Cl. .......................... 360/114; 350/96 WG
[58] Field of Search ........................ 360/114, 134; 340/174 YC; 350/151, 96 WG; 331/94.5 C, 94.5 M

[56] References Cited

U.S. PATENT DOCUMENTS

| | | | |
|---|---|---|---|
| 3,868,589 | 2/1975 | Wang | 331/94.5 C |
| 3,947,087 | 3/1976 | Furuta | 350/96 WG |

OTHER PUBLICATIONS

J. E. Goell, *Barium Silicate ... Optical Circuits*, Apr. 1973, Applied Optics.
Nahory et al., *Beam Deflection ... Hetero Structures* Appl. Phyys. Lett., vol. 23, No. 10, Nov. 15, 1973.

*Primary Examiner*—Harold I. Pitts
*Attorney, Agent, or Firm*—Hill, Gross, Simpson, Van Santen, Steadman, Chiara & Simpson

[57] ABSTRACT

Magnetically stored data, for example data stored on a magnetic tape is converted directly into optical signals by an arrangement which comprises a magneto-optical modulator and a wave guide laser. The wave guide laser has an index of refraction $n_2$ and is arranged on a transparent substrate which has an index of refraction $n_3$ by epitaxial growth. The magneto-optical modulator has an index of refraction $n_1$ and is applied as an epitaxial growth to the wave guide laser. The indices of refraction fulfill the condition that $n_1 > n_2 > n_3$.

6 Claims, 2 Drawing Figures

ARRANGEMENT FOR THE DIRECT CONVERSION OF ITEMS OF DATA STORED IN MAGNETIC FORM INTO OPTICAL SIGNALS

BACKGROUND OF THE INVENTION

1. Field of the Invention

This invention relates to an arrangement for directly converting magnetically stored data into optical signals, and more particularly to such an arrangement which comprises a magneto-optical modulator and a wave guide laser.

2. Description of the Prior Art

Optical data processing which operates with integrated optical systems requires an arrangement which converts the data magnetically stored on a conventional data carrier, e.g. a magnetic tape, into optical data which is to be further processed heretofore, such conversion generally included a plurality of conversion steps and, accordingly, required several conversion devices.

SUMMARY OF THE INVENTION

The object of the present invention is to provide an arrangement for directly converting magnetically stored data into optical signals, which arrangement operates without intermediate conversion of the signal, possesses a high degree of sensitivity, and facilitates a compact, integrated construction.

In realizing this object, it is proposed, in accordance with the invention, that a wave guide laser having an index of refraction $n_2$ be arranged on a transparent substrate having an index of refraction $n_3$ by epitaxial growth, that a magneto-optical material having an index of refraction $n_1$ is arranged by epitaxial growth on the wave guide laser, and that the indices of refraction fulfill the following condition:

$$n_1 > n_2 > n_3.$$

The substrate advantageously consists of sapphire, and the wave guide laser consists of yttrium-aluminum-garnet doped with neodymium, and the magneto-optical modulator consists of yttrium-iron-garnet.

Preferably, the pump light source for the wave guide laser is arranged on the free side of the substrate, and consists either of pump lamps or of luminescence diodes matched in emission wavelength to the pump of yttrium-aluminum-garnet.

It is particularly favorable if an absorption free intermediate layer with a thickness in the order of a few wave lengths is arranged on the magneto-optical modulator. The index of refraction of the intermediate layer must be lower than the index of refraction $n_1$ of the magneto-optical modulator.

The arrangement of the magneto-optical modulator within the laser resonator provides an arrangement constructed in accordance with the invention with a high degree of sensitivity and the arrangement is capable of using digital optical signals. A compact, integrated construction is achieved by the epitaxial growth of the magneto-optical modulator onto the laser material.

BRIEF DESCRIPTION OF THE DRAWINGS

Other objects, features and advantages of the invention, its organization, construction and operation will be best understood from the following detailed description taken in conjunction with the accompanying drawing, on which.

DESCRIPTION OF THE PREFERRED EMBODIMENTS

Figure 1:
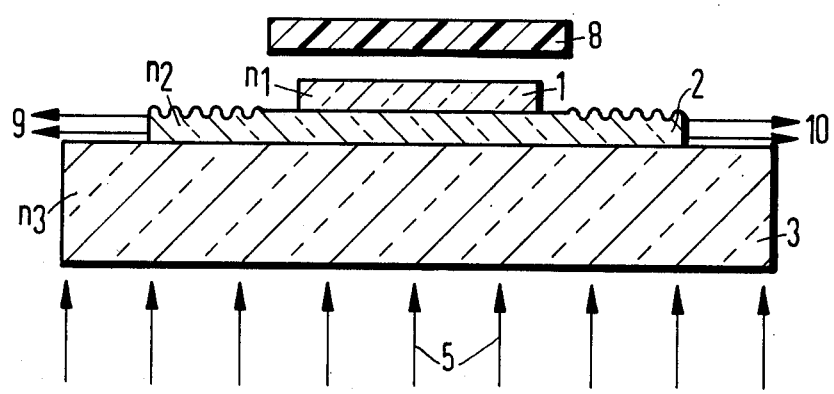
FIG. 1 is a sectional view of a conversion arrangement constructed in accordance with the invention.
Figure 2:
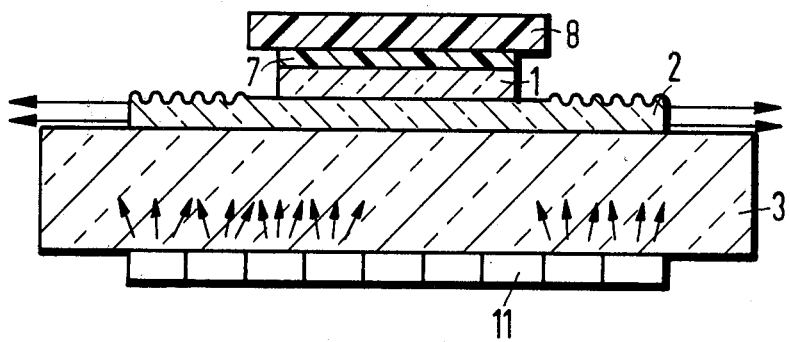
FIG. 2 is a sectional view of a second exemplary embodiment of an arrangement constructed in accordance with the invention.

Referring to both FIGS. 1 and 2, a laser material 2 in the form of an yttrium-aluminum-garnet doped with neodymium (YAG:Nd$^{3+}$) is epitaxially grown on a sapphire substrate 3. The optical resonator is realized, for example, by ion beam etching as a "distributed feedback" resonator, or by the direct reflection of the parallel end faces of the laser material 2. The pumping of the laser is effected optically through the transparent substrate 3 in the direction of the arrows 5 which represent a pump lamp, or as shown in FIG. 2, with luminescence diodes 11 the emission wavelength of which is matched to the pump band of yttrium-aluminum-garnet.

In a second epitaxial process, yttrium-iron-garnet (YIG) is applied as a magneto-optical modulator 1 to the laser material 2. Because of the crystallographic similarity of YIG and YAG, the epitaxial process presents no difficulties. The thicknesses of the YAG layer and the YIG layer are approximately equal and, preferably, amount to a few $\mu$um. When the laser is continuously pumped above threshold, a stationary mode distribution is formed in the laser resonator which also affects the YIG layer as its index of refraction $n_1$ is greater than the index of refraction $n_2$ of the YAG layer which, in turn, is greater than the index of refraction $n_3$ of the substrate. Therefore, the magneto-optical modulator is a part of the resonator volume.

The direction and the magnitude of the magnetization of the modulator 1 influences the mode distribution in the laser resonator via the magneto-optical effect i.e. the magnetization of the modulator determines the stationary mode distribution which is formed in the laser resonator and the number of modes thereof. If the magnetization is altered in magnitude and/or direction by an external magnetic field, a change occurs in the mode conversion in the YIG layer and, therefore, in the mode distribution and number of modes of the laser. Inasmuch as the mode distribution and the number of modes determine the properties of laser emission outside the resonator, such as divergency, direction distribution, intensity distribution, and power, a change in the magnetization of the modulator 1 becomes manifest in a change in these four parameters. Also, on-off switching can be achieved when the laser is operated in the region of the threshold.

It is now possible to directly convert magnetically stored information into light signals. A magnetic carrier, for example a magnetic tape 8, on which items of data are recorded in the currently conventional form of longitudinal changes in magnetic flux direction, can be moved past the modulator 1 at a short distance there above. Each change in magnetic flux direction of the tape 8 results, by virtue of the above described effect, in a change in the properties of the laser emission 9 and 10 emerging from the resonator. The tape can be moved along the resonator direction, or transversely to the resonator direction. When it is moved transversely to the resonator direction, the typical interval between two changes in flux in the tape (approximately 30 $\mu$m) is well matched to the technologically and optically suitable width of integrated wave guide lasers of a few 10 μm.

In addition, by superimposing a constant magnetic field on the modulator 1 at an angle of 45° to the resonator direction in the layer plane, it is not only possible to record changes in flux direction of the tape, but also to differentiate between different flux directions of the tape in the laser radiation.

The induction which occurs near the surface of the magnetic tape and which is in the order of 1 to 5 gauss leads to a magnetization of the YIG of a few A/cm and, therefore, is sufficient to operate the magneto-optical modulator.

In the exemplary embodiment of the invention illustrated in FIG. 2, a number of luminescence diodes 11 are illustrated in place of a pump lamp. The luminescence dioes 11 are matched in emission wavelength to the pump band of YAG-Nd$^{3+}$. In this construction, an intermediate layer 7, having a thickness of a few wave lengths, is grown or vapor deposited on the magneto-optical modulator 1, so that the magnetic tape 8 can be pressed onto the waveguide laser in order to achieve better defined guidance of the tape without destroying the waveguiding properties. The intermediate layer 7 has a magnetic permeability of $\mu > 1$ and an amplification of the field effect of the tape on the magneto-optical modulator is ensured. The index of refraction $n_0$ of the intermediate layer must be less than the index of refraction $n_1$ of the magneto-optical modulator 1.

Other materials may be employed instead of the above-mentioned laser materials. For example, Nd-ultraphosphate with appropriately matched other substances and other magneto-optical materials may be employed; however, in any case the relationships between the indices of refraction, namely $n_1 > n_2 > n_3$ must be fulfilled.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for directly converting magnetically stored data of a moving record adjacent thereto into optical signals, comprising:
   a wave guide laser having an index of refraction $n_2$;
   a transparent substrate having an index of refraction $n_3$ and carrying said wave guide laser thereon; and
   a magneto-optical modulator carried on said wave guide laser adjacent the moving record and having an index of refraction $n_1$, the indices of refraction having the relationships $$n_1 > n_2 > n_3.$$

2. An arrangement according to claim 1, wherein said wave guide laser is an epitaxial growth on said substrate and said magneto-optical modulator is an epitaxial growth on said wave guide laser.

3. An arrangement according to claim 1, wherein said substrate consists of sapphire, said wave guide laser consists of yttrium-aluminum-garnet doped with neodymium, and said magneto-optical modulator consists of yttrium-iron-garnet.

4. An arrangement according to claim 1, comprising pump lamps on the side of said substrate opposite said wave guide laser.

5. An arrangement according to claim 1, comprising luminescence diodes carried on said substrate on the side opposite said wave guide laser and matched in emission wavelength to the pump band of said wave guide laser.

6. An arrangement according to claim 1, comprising an intermediate layer carried on said magneto-optical modulator and having a thickness of a few wavelengths and an index of refraction which is less than the index of refraction $n_1$ of said magneto-optical modulator.

* * * * *